United States Patent [19]

Schiavi

[11] Patent Number: 4,930,456
[45] Date of Patent: Jun. 5, 1990

[54] PERFECTED FEEDING DEVICES FOR INTERNAL COMBUSTION ENGINES

[76] Inventor: Cesare Schiavi, Via Rivasso 4, Agazzano, Italy

[21] Appl. No.: 436,903

[22] Filed: Nov. 15, 1989

[30] Foreign Application Priority Data

Feb. 10, 1989 [IT] Italy ................. 44803 A/89

[51] Int. Cl.⁵ .......................................... F02M 25/06
[52] U.S. Cl. ................................................ 123/572
[58] Field of Search ................... 123/572, 573, 574

[56] References Cited

U.S. PATENT DOCUMENTS

| | | | |
|---|---|---|---|
| 2,489,230 | 11/1949 | Winkler | 123/572 |
| 3,116,727 | 1/1964 | Dietrich | 123/572 |
| 3,381,673 | 5/1968 | Drysdale | 123/572 |
| 3,589,347 | 6/1971 | Sawada | 123/572 |
| 4,256,064 | 3/1981 | Thorn | 123/572 |
| 4,345,573 | 8/1982 | Obata | 123/572 |
| 4,515,137 | 5/1985 | Manolis | 123/572 |

FOREIGN PATENT DOCUMENTS 0891988 12/1981 U.S.S.R. ............................. 123/572

*Primary Examiner*—Willis R. Wolfe
*Assistant Examiner*—M. Macy
*Attorney, Agent, or Firm*—Notaro & Michalos

[57] ABSTRACT

A device to be attached to the air-fuel inlet manifold of internal combustion engines. In particular on the carburetor inlet manifold and connected to the oil sump to convey oil saturated air that is then mixed with the inlet air of the engine. It improves the combustibility of the air-petrol (fuel) mixture resulting in an increase in engine efficiency.

4 Claims, 2 Drawing Sheets

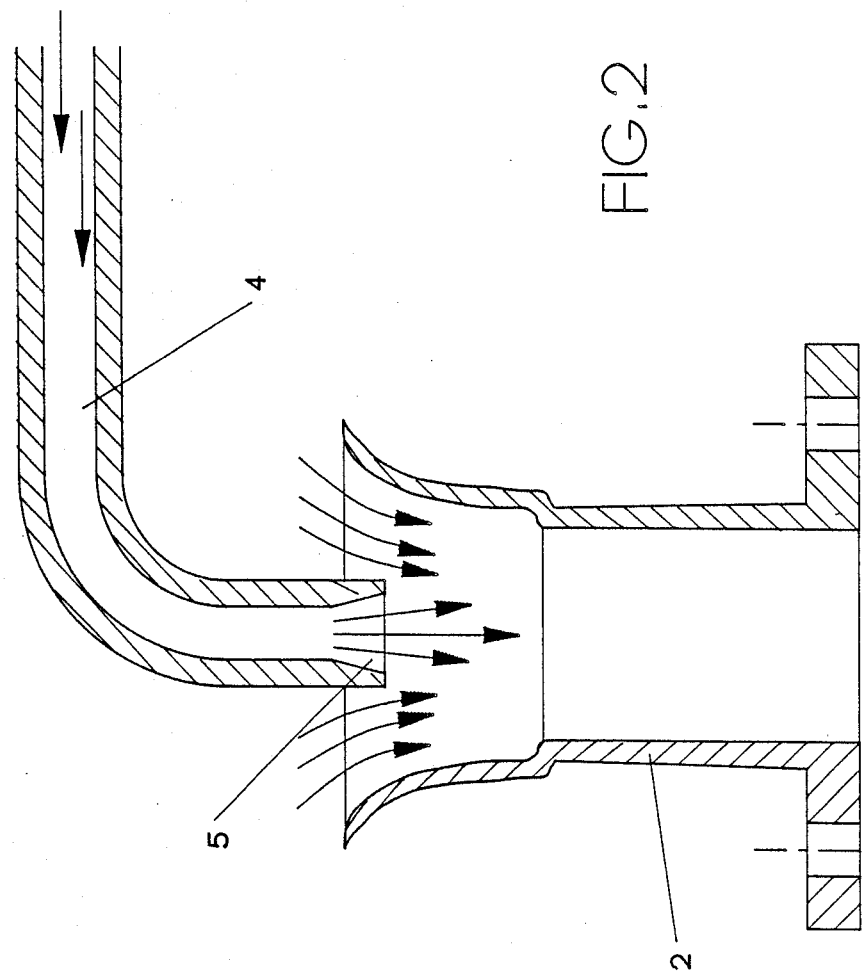

PERFECTED FEEDING DEVICES FOR INTERNAL COMBUSTION ENGINES

The present invention concerns devices for perfecting the fuel/air intake for internal combustion engines. In particular the device is aimed at mixing intake air with oil saturated air taken from the engine oil sump.

One gets an overall improvement in engine efficiency and a marked reduction in pollution which emanates from the exhaust emissions. The apparatus described in this invention can be fitted to spark ignition engines powered by petrol, L.P.G. methane and also diesel engines.

It is well known that there are a number of difficulties which are encountered in precisely setting the air-fuel ratio for internal combustion engines. These difficulties are caused by a number of factors some of which are:

the fact that air-intake filter, with time, begins to clog; thus impairing its performance.

the fact that the ambient atmospheric pressure varies both with the seasons and the climatic conditions in which the engine operates.

the fact that with some engines their intakes make it difficult to achieve an optimum air-fuel ratio.

the fact that when the body of the carburettor and/or the inlet manifold reaches a temperature of about 90° C. this causes the fuel component to vaporise. This causes some of the fuel to disperse which gives rise to a back-turbulence effect which in turn inhibits the optimum combustion of the mixture in the cylinder at the exact moment of ignition.

As a consequence there is a reduction in the efficiency of the motor and an increase in its fuel consumption. The unburnt fuel is expelled with the exhaust fumes which adds to atmospheric pollution.

To try to avoid the problems described above many different solutions have been experimented with for example: the analysis of the effect of different cylinder configurations, the modifying of the inlet manifold, the use of multiple valves per cylinder and also twin spark plugs etc . . .

By a series of experiments intended to improve (actual) engine efficiency the inventor has discovered that by mixing the oil vapour, (i.e. saturated air) which forms within the engine's oil sump, with the engine's air/fuel mixture an improvement both in engine performance and efficiency occurs.

For this purpose this invention relates to a device designed to improve the "fueling" of the internal combustion engine. The device consists of connecting a venturi tube between the carburettor inlet manifold and the engine's oil sump. The oil saturated air already under a slight pressure mixes quickly with air-fuel mixture; thus allowing for an improvement both in combustion and engine efficiency.

The following is a description of the invention with reference to the attached diagrams.

FIG. 2 is a diagram of the carburettor manifold with the invented device attached.

Figure 1:
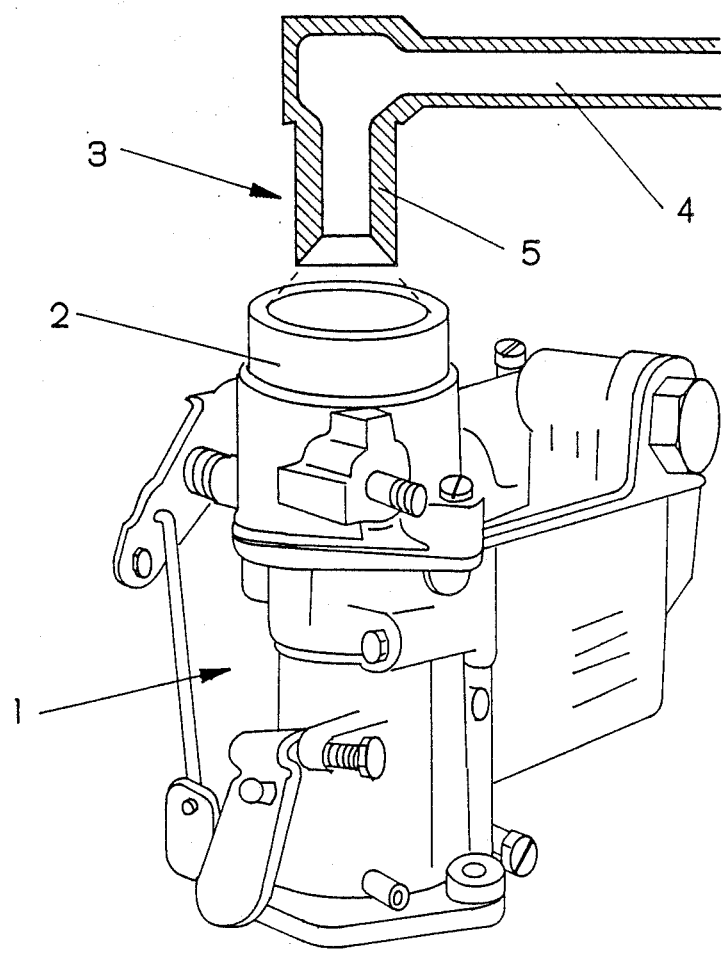
FIG. 1 shows a diagram of a carburettor with the invented device attached.

Referring to FIG. 1, No. 1 indicates the body of the carburettor with the inlet manifold indicated by 2.

On top of the manifold an injector 3 is attached in a normal way e.g. by means of suitable spacers and connected at its other end to the engine oil sump.

(It is obvious that motors having more than one carburettor will require a corresponding number of devices).

The oil saturated air flows along the duct (tube) 4 to the injector which terminates into a nozzle 5 whose axis coincides with the central axis of the manifold.

An inherent property of piston engines is that the oil vapour pressure in the engine oil sump is slightly higher than the external ambient atmospheric pressure by about 0.2–0.3 Bar (2.9–4.35 P.S.I.). This pressure enables the oil saturated air to flow along the duct (tube) 4 to the nozzle 5 from which it exits mixing with the air at the carburettor inlet.

This increases the turbulence, at the inlet, of the air fuel mixture and as a result improves its combustion.

The oil saturated air has the effect of retarding detonation during the compression stroke of the combustion cycle. This is because the oil has a higher ignition temperature causing the ignition to occur at the most optimum moment. One major benefit is that this allows for the use of fuel with a reduced lead content. During ignition the oil vapour ignites along with the normal engine fuel thus improving engine efficiency (due to the calorific boost given by its presence).

Consequently the improvement in combustion is followed by a verifiable reduction in fuel consumption.

As noted previously nozzle 5 can be fixed above the carburettor air inlet so that it conveys the oil saturated air towards the carburettor venturi tube. The dispersion of the oil saturated air is further improved by profiling the nozzle mouth to being inwardly conical.

The distance at which the nozzles' mouth is placed from the inlet manifold is determined such that when the oil saturated air is sprayed from the nozzle 5 it covers the maximum cross-sectional area of the manifold 2.

For diesel engines the injectors 3 are placed at the entry of the air inlet manifold, always placing the nozzle in an axial position with respect to its inlet duct. In this case the flow of the oil saturated air at 90° C. helps to pre-heat the fuel which further improves its combustibility during ignition.

Consequently there is a reduction in "diesel exhaust residues" which would otherwise end up in the atmosphere.

I claim:

1. A fuel injection device designed for internal combustion engines
having a carburetor with an inlet manifold, the inlet manifold having a central axis
wherein means are provided for directing a flow of oil saturated air developed in an oil sump to the carburettor inlet manifold, wherein said means comprise a nozzle connected between the oil sump of the internal combustion engine and the carburetor inlet manifold; the axis of said nozzle being coincident with the central axis of the carburetor inlet manifold.

2. The device as described in claim "1" wherein said means comprises a nozzle connected between the engine oil sump and the inlet manifold of a diesel engine.

3. The device as described in claim 1 "3" wherein the mouth of the nozzle outlet has an inward conical profile.

4. The device as described in claim 3 wherein the mouth of the nozzle is placed at a pre-determined distance from the inlet manifold such that when the oil saturated air is sprayed, it covers the maximum cross-sectional area of the manifold.

* * * * *